(12) United States Patent
Kawaharazaki et al.

(10) Patent No.: US 10,247,360 B2
(45) Date of Patent: Apr. 2, 2019

(54) METHOD FOR FILLING HYDROGEN STORAGE ALLOY

(71) Applicant: THE JAPAN STEEL WORKS, LTD., Shinagawa-ku, Tokyo (JP)

(72) Inventors: Yoshinori Kawaharazaki, Muroran (JP); Yoshihiko Hayashi, Muroran (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 239 days.

(21) Appl. No.: 15/123,973

(22) PCT Filed: Feb. 26, 2015

(86) PCT No.: PCT/JP2015/055712
§ 371 (c)(1),
(2) Date: Sep. 6, 2016

(87) PCT Pub. No.: WO2015/133378
PCT Pub. Date: Sep. 11, 2015

(65) Prior Publication Data
US 2017/0016578 A1   Jan. 19, 2017

(30) Foreign Application Priority Data
Mar. 7, 2014 (JP) .................. 2014-044528

(51) Int. Cl.
*C01B 3/00* (2006.01)
*F17C 11/00* (2006.01)

(52) U.S. Cl.
CPC .......... *F17C 11/005* (2013.01); *C01B 3/0031* (2013.01); *C01B 3/0073* (2013.01);
(Continued)

(58) Field of Classification Search
CPC ...... F17C 11/005; F17C 11/00; C01B 3/0078; C01B 3/0084; C01B 3/0073; Y02E 60/321
See application file for complete search history.

(56) References Cited

U.S. PATENT DOCUMENTS

| 8,544,507 B2 | 10/2013 | Matsumoto et al. |
| 2003/0053777 A1 | 3/2003 | Fujii et al. |

(Continued)

FOREIGN PATENT DOCUMENTS

| CN | 101970299 A | 2/2011 |
| JP | 57-145001 A | 9/1982 |

(Continued)

OTHER PUBLICATIONS

Communication dated Jul. 4, 2017, from the State Intellectual Property Office of People's Republic of China in counterpart Application No. 201580012542.3.

(Continued)

*Primary Examiner* — Jason K Niesz
(74) *Attorney, Agent, or Firm* — Sughrue Mion, PLLC

(57) ABSTRACT

An object of the present invention is to enable filling a hydrogen storage alloy uniformly and easily at the time of filling the hydrogen storage alloy. The invention relates to a method for filling a hydrogen storage alloy including, when the hydrogen storage alloy that has been made as a resin composite material by mixing hydrogen storage alloy particles or powder with a resin and carbon fiber is filled into a tank, vibrating the tank at a predetermined frequency to adjust a filling ratio of the hydrogen storage alloy in the tank.

1 Claim, 4 Drawing Sheets

(52) U.S. Cl.
CPC .......... *C01B 3/0078* (2013.01); *C01B 3/0084* (2013.01); *F17C 11/00* (2013.01); *Y02E 60/321* (2013.01); *Y02E 60/327* (2013.01)

(56) References Cited

U.S. PATENT DOCUMENTS

| | | |
|---|---|---|
| 2009/0000963 A1 | 1/2009 | Mori et al. |
| 2009/0105362 A1 | 4/2009 | Anderson et al. |
| 2010/0108543 A1 | 5/2010 | Tokiwa et al. |
| 2011/0003926 A1 | 1/2011 | Nogi et al. |
| 2011/0006140 A1 | 1/2011 | Ishizaki et al. |
| 2011/0009590 A1 | 1/2011 | Matsumoto et al. |
| 2011/0011491 A1 | 1/2011 | Matsumoto et al. |
| 2011/0015351 A1 | 1/2011 | Nogi et al. |
| 2011/0028670 A1 | 2/2011 | Matsumoto et al. |
| 2011/0088806 A1 | 4/2011 | Nogi et al. |
| 2011/0110730 A1 | 5/2011 | Nogi et al. |
| 2011/0166300 A1 | 7/2011 | Dairoku et al. |

FOREIGN PATENT DOCUMENTS

| | | |
|---|---|---|
| JP | 59-49689 U | 4/1984 |
| JP | 63-225799 A | 9/1988 |
| JP | 2-125735 U | 10/1990 |
| JP | 3-97803 A | 4/1991 |
| JP | 4-149001 A | 5/1992 |
| JP | 4-277915 A | 10/1992 |
| JP | 5-99074 A | 4/1993 |
| JP | 2000-281302 A | 10/2000 |
| JP | 2001-200159 A | 7/2001 |
| JP | 2002-156097 A | 5/2002 |
| JP | 2003-121659 A | 4/2003 |
| JP | 2008-190627 A | 8/2006 |
| JP | 2006-291993 A | 10/2006 |
| JP | 2009-2370 A | 1/2009 |
| JP | 2013-241597 A | 12/2013 |
| WO | 2004/031645 A1 | 4/2004 |
| WO | 2008/096758 A1 | 8/2008 |
| WO | 2009/113671 A1 | 9/2009 |

OTHER PUBLICATIONS

Communication dated May 26, 2015 issued by the International Searching Authority in counterpart International Application No. PCT/JP2015/055712 (PCT/ISA/210).

Written Opinion dated May 26, 2015 issued by the International Searching Authority in counterpart International Application No. PCT/JP2015/055712 (PCT/ISA/237).

[FIG. 1]
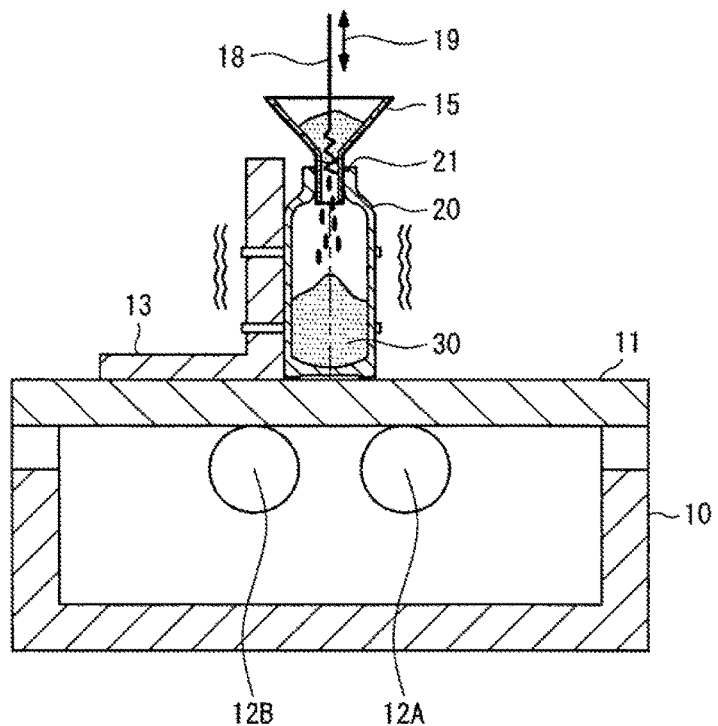
[FIG. 2]
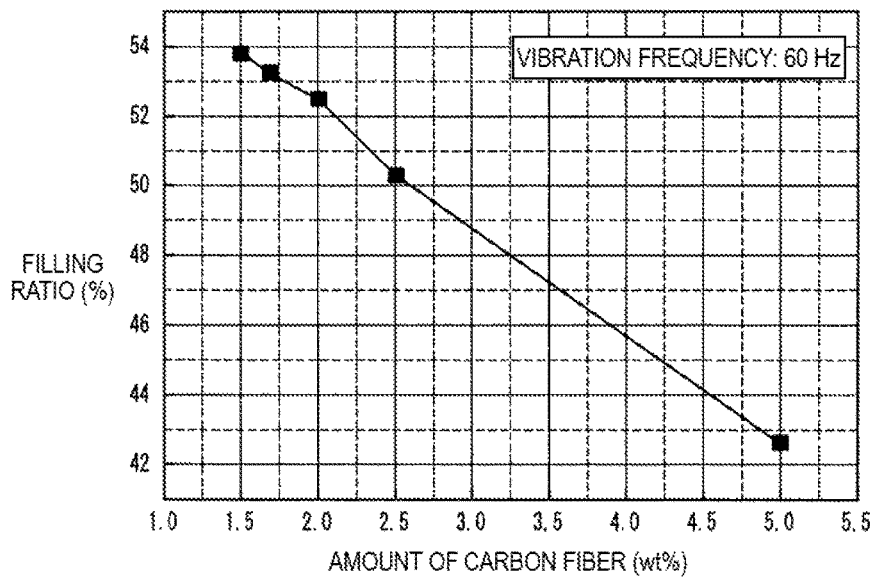

[FIG. 3]
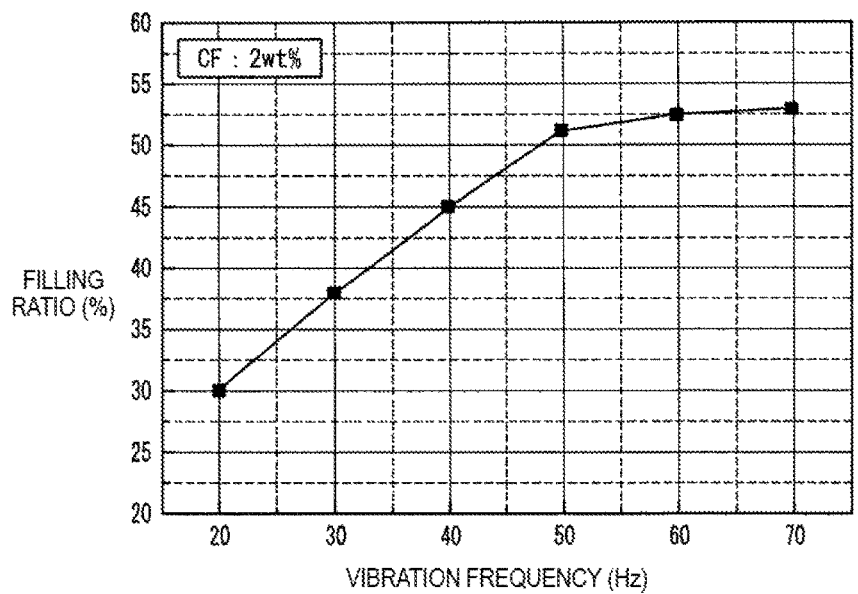
[FIG. 4]
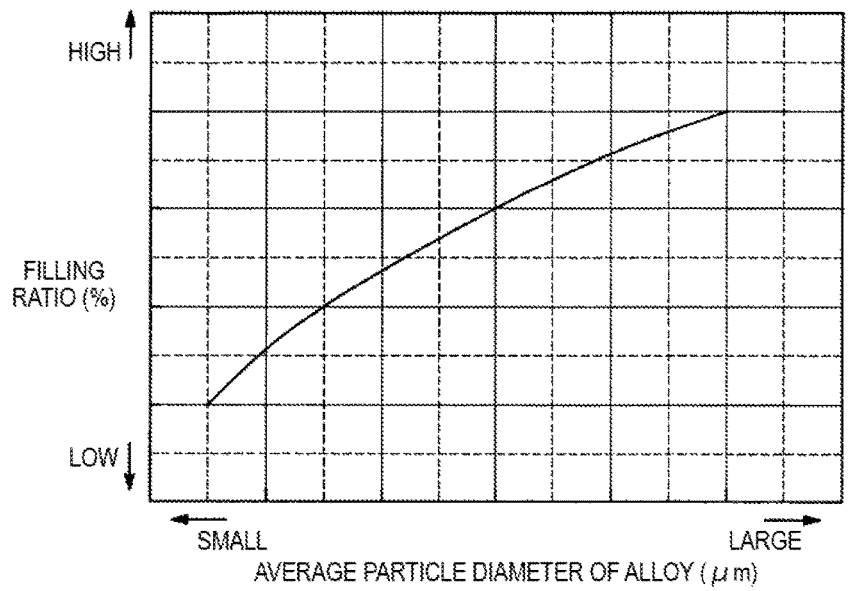

[FIG. 5]
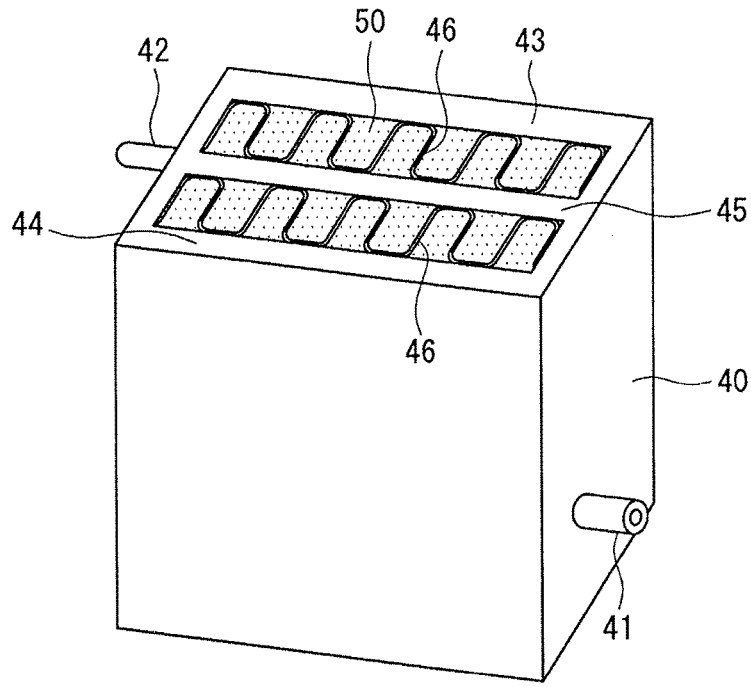
[FIG. 6]
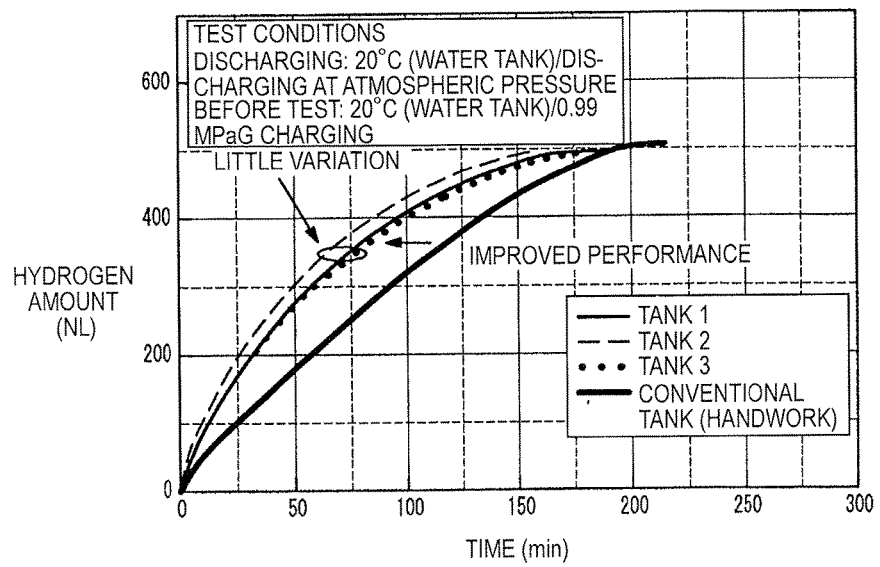

[ FIG. 7 ]
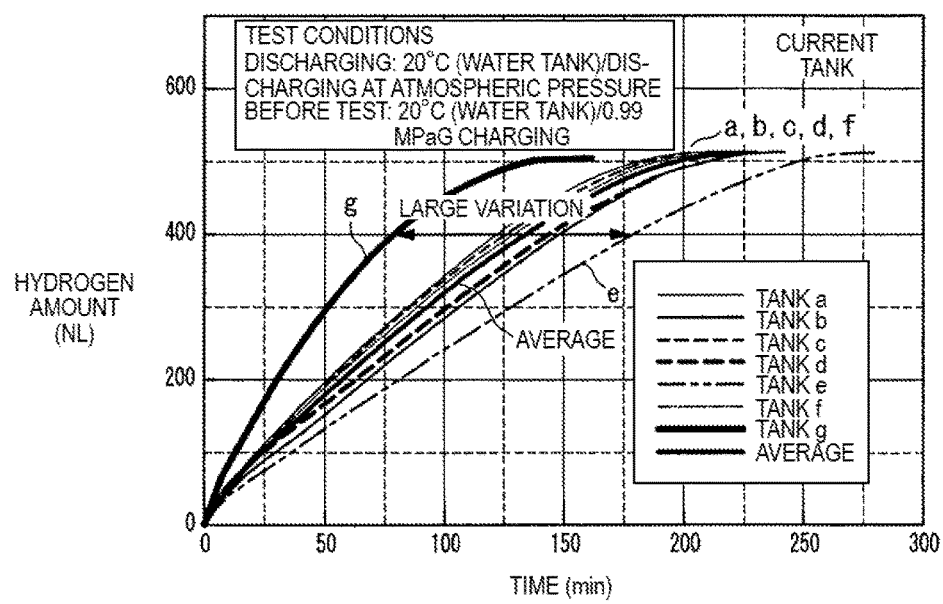

METHOD FOR FILLING HYDROGEN STORAGE ALLOY

TECHNICAL FIELD

The present invention relates to a method for filling a hydrogen storage alloy, which has been made as a resin composite material by mixing hydrogen storage alloy particles or powder with a resin and carbon fiber, into a tank.

BACKGROUND ART

A hydrogen storage alloy is accommodated in a hydrogen storage alloy tank and charges and discharges a hydrogen gas. However, since the hydrogen storage alloy itself expands and contracts by 30% at most with the charging and discharging of the hydrogen gas, stress generated at that time gives strain to the hydrogen storage alloy tank to cause tank deformation and, in an extreme case, there may be generated cracks on the tank. As a method for alleviating the stress generated by the alloy expansion to suppress the tank strain, there is a method of accommodating a hydrogen storage alloy material, which has been made as a resin composite material by mixing a resin and carbon fiber with a hydrogen storage alloy, in a hydrogen storage alloy tank.

A general hydrogen storage alloy powder becomes a dry flowable state but, in the case where a gel-like resin having a viscosity of 500 to 10,000 mPa·s and consistency and carbon fiber are added and mixed thereto in appropriate amounts, since the hydrogen storage alloy contained in the resin composite material becomes a wet sand-like hydrogen storage alloy, it becomes difficult to fill the alloy into a cylinder-type hydrogen storage alloy tank having a small mouth (opening) as a pressure tank.

In a conventional method for filling a hydrogen storage alloy into a tank, it is common to perform the filling manually by a worker. As methods for filling a hydrogen storage alloy efficiently and with good productivity, techniques shown in PTLs 1 and 2 are disclosed.

PTL 1 discloses a method of dispersing a hydrogen storage alloy powder into a fluid, injecting the dispersion into a reaction tank, and removing the fluid component afterward. PTL 2 discloses a method of replacing small rooms partitioned with air curtains by an inert gas and continuously filling an alloy with minimum contamination in the filling rooms while hydrogen storage alloy tanks are transferred on a belt conveyor. Moreover, PTL 2 describes a technique that can fill the alloy into all over the tank regardless of the internal structure by imparting vibration to the hydrogen storage alloy tank.

CITATION LIST

Patent Literature

PTL 1: JP-A-4-149001
PTL 2: JP-A-2002-156097

SUMMARY OF INVENTION

Technical Problem

However, the methods for filling a hydrogen storage alloy according to the conventional art cannot be applied to the case of filling a hydrogen storage alloy which has been made as a resin composite material by mixing hydrogen storage alloy particles or powder with a resin and carbon fiber.

In the method described in PTL 1, although the hydrogen storage alloy has been uniformly covered with a resin, the resin is taken away at the time of removing the fluid for fluidization in a later step and thus the effect of the resin for alleviating stress disappears.

Moreover, in PTL 2, there is disclosed a method of continuously filling an alloy into hydrogen storage alloy tanks on a belt conveyor, and the hydrogen storage alloy to be used is a non-viscous powdery hydrogen storage alloy. Therefore, the method cannot be applied to adjustment of the filling ratio of a hydrogen storage alloy material to be made as a resin composite material mixed with a resin and carbon fiber. The vibration or the like in PTL 2 is performed for filling a material into all over the internal structure and, even in the case where vibration or rotation is imparted to the tank, the operation is performed after filling is done. Particularly, to a cylinder-type tank having a small mouth, the hydrogen storage alloy material to be made as such a resin composite material cannot be employed in the filling method where simple vibration alone is used, owing to viscosity.

Automation of filling is difficult for the resin composite material obtained by mixing such hydrogen storage alloy particles (or powder) with a resin and carbon fiber and thus the particles are generally filled manually as mentioned above. Also, a hydrogen storage alloy does not exhibit its performance in a state of only being filled in a tank owing to too low filling ratio unless force is imparted thereto. On the other hand, when the hydrogen storage alloy is pushed too much, the filling ratio is excessively increased to generate pressure loss at the inside, so that charging and discharging performance is influenced. Therefore, carbon fiber is added and mixed with the hydrogen storage alloy to be made as a resin composite material so as to achieve a suitable filling ratio and the filling ratio is adjusted by pushing it with controlling the force suitably. However, in general, since the pushing operation is performed manually, alloy filling density becomes uneven and variation arises in the hydrogen discharging performance among lots. Moreover, the operation takes much time and labor and is insufficient in view of efficiency.

The invention is devised on the background of the above circumstances and for solving problems such as unevenness in alloy filling density, variation in the hydrogen discharging performance, and difficulty of alloy filling operation. An object thereof is to provide a filling method capable of easily filling a hydrogen storage alloy, which has been made as a resin composite material by mixing hydrogen storage alloy particles (or powder) with a resin and carbon fiber, into a tank and capable of adjusting the filling ratio uniformly.

Solution to Problem

As a result of extensive studies of the present inventors, it has been found that the above problems can be solved by adjusting a filling ratio of the hydrogen storage alloy in the tank with vibrating the tank at a predetermined frequency at the time of filling the hydrogen storage alloy, which has been made as a resin composite material by mixing hydrogen storage alloy particles or powder with a resin and carbon fiber, into the tank. Thus, they have accomplished the present invention.

That is, a summary of the present invention may be as follows.

<1> A method for filling a hydrogen storage alloy, comprising: when the hydrogen storage alloy that has been made as a resin composite material by mixing hydrogen storage alloy particles or powder with a resin and carbon fiber is filled into a tank, vibrating the tank at a predetermined frequency to adjust a filling ratio of the hydrogen storage alloy in the tank.
<2> The method for filling a hydrogen storage alloy according to <1>, wherein vibration is imparted to the tank in the course of filling the hydrogen storage alloy into the tank.
<3> The method for filling a hydrogen storage alloy according to the <1> or <2>, wherein a target filling ratio is set by a mixing ratio of the resin and the carbon fiber.
<4> The method for filling a hydrogen storage alloy according to any one of <1> to <3>, wherein the average particle diameter of the hydrogen storage alloy particles or powder is 1 to 1000 μm.
<5> The method for filling a hydrogen storage alloy according to any one of <1> to <4>, wherein the mixing ratio of the carbon fiber is controlled to 0.1 to 5.0% by weight relative to the amount of the hydrogen storage alloy.
<6> The method for filling a hydrogen storage alloy according to any one of <1> to <5>, wherein the predetermined frequency is 30 to 70 Hz.
<7> The method for filling a hydrogen storage alloy according to any one of <1> to <6>, wherein the tank is vibrated through movement at least in a vertical direction.
<8> The method for filling a hydrogen storage alloy according to <7>, wherein vibration amount for the movement in the vertical direction is 0.1 to 2.0 mm.
<9> The method for filling a hydrogen storage alloy according to <7> or <8>, wherein the tank is vibrated for 0.5 to 30 minutes.
<10> The method for filling a hydrogen storage alloy according to any one of <1> to <9>, wherein viscosity of the resin at 25° C. is 500 to 10,000 mPa·s.
<11> The method for filling a hydrogen storage alloy according to any one of <1> to <10>, wherein the resin is a gel-like resin having a ¼ consistency of 10 to 200 at 25° C.
<12> The method for filling a hydrogen storage alloy according to any one of <1> to <11>, wherein a mixing amount of the resin is 1 to 50% by weight relative to the amount of the hydrogen storage alloy.
<13> The method for filling a hydrogen storage alloy according to any one of <1> to <12>, wherein a target filling ratio of the hydrogen storage alloy is 40 to 55%.
<14> The method for filling a hydrogen storage alloy according to any one of <1> to <13>, comprising: disposing a funnel in an opening of the tank; filling the hydrogen storage alloy, which has been made as the resin composite material, into the tank through the funnel; and disposing a scraping rod extending downward from a central part of the funnel.

Advantageous Effects of Invention

According to the present invention, a hydrogen storage alloy which has been made as a resin composite material by mixing hydrogen storage alloy particles or powder with a resin and carbon fiber can be filled into a tank in a desired filling ratio. Moreover, since the filling can be performed with adjusting the filling ratio uniformly, pressure loss in the tank can be suppressed low, variation in hydrogen discharging performance decreases, and a discharging rate can be also improved. Furthermore, there is exhibited an effect that a time for alloy filling operation can be remarkably shortened.

BRIEF DESCRIPTION OF DRAWINGS

FIG. 1 is a figure explaining a filling method in one embodiment of the invention.

FIG. 2 is a graph showing a relationship between a mixing amount of carbon fiber to a hydrogen storage alloy and a filling ratio of the hydrogen storage alloy at the time when filling with vibration is performed.

FIG. 3 is a graph showing a relationship between vibration frequency to a tank and a filling ratio of a hydrogen storage alloy at the time when filling with vibration is performed.

FIG. 4 is a graph showing a relationship between an average particle diameter or powder diameter (alloy average particle size) of hydrogen storage alloy particles and a filling ratio of a hydrogen storage alloy at the time when filling with vibration is performed.

FIG. 5 is a figure showing an example of a tank to which another embodiment of the invention is applied.

FIG. 6 is a graph showing variation of hydrogen amount in a plurality of filled tanks obtained by a filling method according to one Example of the invention.

FIG. 7 is a graph showing variation of hydrogen amount in a plurality of filled tanks obtained by a conventional filling method.

DESCRIPTION OF EMBODIMENTS

The following will explain modes for carrying out the present invention in detail but the explanation of constituent features to be described below is one example (representative example) of the embodiments of the invention and the invention is not limited to these contents unless it exceeds the gist thereof. Here, "% by weight" and "% by mass" have the same meaning.

The invention relates to a method for filling a hydrogen storage alloy including, when the hydrogen storage alloy that has been made as a resin composite material by mixing hydrogen storage alloy particles or powder with a resin and carbon fiber is filled into the tank, vibrating the tank at a predetermined frequency to adjust a filling ratio of the hydrogen storage alloy in the tank.

According to the above, the hydrogen storage alloy can be uniformly filled and the filling rate can be adjusted by continuously imparting vibration at a predetermined frequency to the tank at filling. Here, the vibration of the tank at the time of filling the hydrogen storage alloy into the tank may be effected by performing filling and vibration alternately, by vibrating the tank after filling, or by imparting vibration with filling (performing filling and vibration simultaneously).

In the invention, it is preferable to impart vibration to the tank in the course of filling the hydrogen storage alloy as the resin composite material into the tank.

According to the above, filling can be more uniformly and easily performed by imparting vibration to the tank during filling. Here, the impartment of vibration to the tank in the course of filling into the tank means that filling and vibration are performed alternately or vibration is imparted with filling (filling and vibration are performed simultaneously).

In the invention, it is preferable to set an objective value of the filling ratio according to the mixing ratio of the resin and the carbon fiber.

According to the above, following the mixing ratio of the resin and the carbon fiber, the objective filling ratio of the hydrogen storage alloy can be set. A correlation is observed between the carbon fiber and the filling amount of the hydrogen storage alloy. The filling ratio is calculated by a volume ratio of the hydrogen storage alloy to a space in the tank.

Incidentally, the filling ratio can be calculated, for example, by the following equation.

Filling ratio (%)=Bulk specific gravity÷True specific gravity of hydrogen storage alloy×100

Bulk density: Bulk density of hydrogen storage alloy particles or powder (g/mL)

True density of hydrogen storage alloy: for example, 8.1 (g/mL)

In the invention, it is preferable that the average particle diameter or powder diameter (hereinafter sometimes simply referred to as average particle diameter) of the hydrogen storage alloy particles or powder is 1 to 1000 µm.

According to the above, more proper hydrogen charging and discharging characteristics are obtained and also the filling ratio can be more easily adjusted to a proper range. Incidentally, more desirably, it is preferable to control a lower limit of the average particle diameter to 50 µm and an upper limit of the average particle diameter to 1000 µm. Moreover, the particle diameter of the hydrogen storage alloy also influences the filling ratio of the hydrogen storage alloy. In view of these points, furthermore, it is more preferable to control the lower limit of the average particle diameter or powder diameter to 400 µm and the upper limit thereof to 800 µm.

The average particle diameter of the hydrogen storage alloy particles or powder can be measured by laser diffraction particle size distribution measurement.

In the invention, it is preferable to control the mixing ratio of the carbon fiber within a range of 0.1 to 5.0% by mass relative to the hydrogen storage alloy.

According to the above, by mixing a suitable amount of the carbon fiber, the filling amount of the hydrogen storage alloy can be adjusted to a suitable amount and good hydrogen charging and discharging characteristics are easily obtained.

In the invention, it is preferable that the predetermined frequency is 30 to 70 Hz.

Although the vibration frequency is adjusted according to the tank shape, it becomes possible to fill the hydrogen storage alloy material more uniformly by continuously imparting suitable vibration to the hydrogen storage alloy material.

For example, in order to increase the filling ratio of the hydrogen storage alloy to 40% or more, a frequency of 30 Hz or more is necessary. When the frequency is controlled to 30 Hz or more, the filling ratio is increased and performance is improved. On the other hand, when it exceeds 70 Hz, the filling ratio of the hydrogen storage alloy is not increased and is saturated at 60 Hz or more. Moreover, in view of apparatus costs, an upper limit is desirably 70 Hz. Usually, the filling ratio into the hydrogen storage alloy tank is controlled to about 50 to 53% and thus the frequency is more desirably 40 to 60 Hz and further desirably 50 to 60 Hz.

In the invention, it is preferable that the tank is vibrated through movement at least in a vertical direction.

According to the above, the filling of the hydrogen storage alloy material is more smoothly performed through the vibration in a vertical direction.

In the invention, it is preferable that vibration amount for the movement in the vertical direction falls within a range of 0.1 to 2.0 mm.

According to the above, the filling of the hydrogen storage alloy is more uniformly performed by suitably determining the vibration amount of the tank. When the vibration amount is controlled to 0.1 mm or more, the effect resulting from vibration can be more sufficiently obtained and, when the vibration amount is controlled to 2.0 mm or less, the alloy powder of the resin composite material can be prevented from jumping up extremely to drop out the alloy from a funnel or the like.

In the invention, it is preferable that the vibration in the vertical direction is performed for 0.5 to 30 minutes.

According to the above, the filling of the hydrogen storage alloy material can be more uniformly and surely performed through the vibration for a suitable time. On the other hand, even when vibration is imparted beyond 30 minutes, the effect of improving the filling ratio is saturated.

In the invention, it is preferable that the viscosity of the resin at 25° C. is 500 to 10,000 mPa·s.

According to the above, when the viscosity of the resin is proper, the filling of the hydrogen storage alloy is facilitated and more uniform filling of the alloy is enabled.

The viscosity can be measured by a determined method using a B-type rotary viscometer.

In the invention, it is preferable that the resin is a gel-like resin having a ¼ consistency of 10 to 200 at 25° C.

Here, the ¼ consistency is measured in accordance with JIS K2220 (2013) and a substance to be measured is an extremely soft substance such as grease.

In the invention, it is preferable that the mixing amount of the resin is 1 to 50% by mass relative to the amount of the hydrogen storage alloy.

When the mixing amount of the resin is controlled to a suitable amount, the filling ratio of the hydrogen storage alloy can be adjusted to a suitable value and softness of the whole hydrogen storage alloy material can be more suitably adjusted.

In the invention, it is preferable that a target filling ratio of the hydrogen storage alloy is 40 to 55%.

According to the above, when the filling ratio of the hydrogen storage alloy is properly controlled, the hydrogen charging-discharging characteristics become more satisfactory and the amount of strain to the tank becomes within a more proper range. When the filling ratio is controlled to 40% or more, the charging-discharging characteristics can be more sufficiently obtained. On the other hand, when the filling ratio is 55 or less, the strain to the tank resulting from the expansion of the hydrogen storage alloy is small, which is more preferred.

In the invention, it is preferable that the tank has a cylindrical shape and one having a relatively small opening diameter as compared to the cylinder diameter is used.

According to the above, the hydrogen storage alloy can be compactly accommodated and also a connecting screw size can be made small by making the opening diameter small, so that seal performance is further improved.

In the invention, it is preferable that a funnel is disposed in the opening of the tank, the hydrogen storage alloy, which has been made as the resin composite material, is filled into the tank through the funnel, and also a scraping rod extending downward from a central part of the funnel is disposed.

In a conventional method, particularly in the case where filling is performed into a cylinder type tank having a small mouth, a funnel is used but, since the hydrogen storage alloy material to be a resin composite material has viscosity, there is a case where the funnel is soon clogged and thus the alloy is difficult to fill even if vibration is manually imparted. According to the above configuration, the filling of the hydrogen storage alloy can be more smoothly performed by using the scraping rod. Moreover, when the scraping rod is moved vertically or rotationally against the tank during stopping or during vibration, it becomes possible to perform the filling of the hydrogen storage alloy more smoothly.

One embodiment of the invention will be explained based on attached drawings.

As the hydrogen storage alloys of the invention, those having compositions of $AB_5$, $AB_2$, AB, and $A_2B$ structures and a BCC structure can be used. Incidentally, as the invention, the kind, composition, crystal structure, and the like of the hydrogen storage alloy are not limited to specific ones. Moreover, the hydrogen storage alloy particles suitably have an average particle diameter or powder diameter of 1 μm to 1000 μm. The method for converting the hydrogen storage alloy into particles or a powder is also not particularly limited and an appropriate method such as an atomization method can be adopted.

FIG. 4 shows a relationship between the average particle diameter and the filling ratio of the hydrogen storage alloy. There is a tendency that the filling ratio decreases when the alloy particle size is fine (small) and the filling ratio increases when the particle size is rough (large). Therefore, from the viewpoint of suppressing variation in the filling ratio, it is further preferable that the alloy particle size is uniformized in a range of 400 to 800 μm as an average particle diameter.

Into the hydrogen storage alloy particles or powder, suitably, a gel-like resin having a viscosity of 500 to 10,000 mPa·s at 25° C. and a 1/4 consistency of 10 to 200 at 25° C. is mixed. As such a resin, the gel-like resin can be obtained by gelling a crosslinkable monomer or polymer such as a silicone, an acrylic monomer or polymer, a urethane, and an epoxy resin as a representative. Of these, the silicone is easy to handle and has hydrogen gas permeability and the control of gelation is easy, so that it can be preferably used.

A silicone is a liquid organopolysiloxane and generally, one represented by the formula (RR'SiO)n (where R and R' are each an organic substituent and n is a natural number) is used. As specific examples of R and R', each independently, any of alkyl groups such as a methyl group and an ethyl group, a phenyl group, and fluoroalkyl groups can be used. At the end of the molecular chain, a functional group such as a hydroxyl group, an alkoxy group, or a vinyl group may be present. As a mixing amount of the resin, the mixing amount can be determined in an amount of 1 to 50% by mass relative to the hydrogen storage alloy. As the resin, a soft resin is preferable and it can keep more proper resin viscosity even upon alloy expansion and absorption.

Moreover, into the hydrogen storage alloy particles or powder, carbon fiber is mixed. The carbon fiber enhances heat transmittance and can adjust the filling ratio of the hydrogen storage alloy. As the carbon fiber, it is preferable to use a needle-like heat-transmittable carbon fiber material having a diameter or width of 1 to 100 μm and an aspect ratio of 5 or more.

The carbon fiber can be mixed simultaneously to the addition and mixing of the resin. With regard to an adding amount, it is preferable to add the carbon fiber in an amount of 0.1 to 5.0% by mass relative to the amount of the hydrogen storage alloy.

FIG. 2 shows a relationship of a change of the filling ratio of the hydrogen storage alloy having been made as a resin composite material to which vibration is imparted under conditions of a vibration frequency of 60 Hz, a vibration amount of 1.6 mm, and 5 minutes, when the amount of carbon fiber (needle-like carbon fiber having a diameter of 10 μm, a length of 6 mm, and an aspect ratio of 600) to be added to the hydrogen storage alloy having an average particle diameter of 100 to 600 μm is changed. Incidentally, the silicone resin used at this time is an A liquid and a B liquid of WACKER SilGel612 (manufactured by Wacker Asahikasei Silicone Co., Ltd.), which has a liquid viscosity of 1,000 mPa·s at 25° C., and the 1/4 consistency of the gel-like resin at 25° C. is 85 and the mixing amount thereof is 3.5% by mass.

As mentioned above, by changing the mixing amount of the carbon fiber, the filling ratio of the hydrogen storage alloy is remarkably changed and the adjustment is further facilitated.

Moreover, in order to adjust the filling ratio of the hydrogen storage alloy, the vibration frequency is adjusted.

Furthermore, a time for imparting vibration to the tank is not limited to a specific range in the invention but is desirably 0.5 to 30 minutes.

In addition, at the time of the vibration, vibration is imparted to the tank at least in a vertical direction and it is preferable that the vibration amount in the vertical direction is controlled within a range of 0.1 to 2.0 mm. Incidentally, in the vibration, vibration in a horizontal direction or rotational vibration may be combined other than the vibration in a vertical direction or may be imparted with differing in time.

FIG. 3 shows a relationship of the filling ratio of the hydrogen storage alloy to be made as a resin composite material at the time when the vibration frequency is changed. Thus, by changing the vibration frequency, the filling ratio is changed and the adjustment of the filling ratio is facilitated. FIG. 3 shows a relationship of a change of the filling ratio of the hydrogen storage alloy having been made as a resin composite material in the case where vibration is imparted to the hydrogen storage alloy having an average particle diameter of 300 to 800 μm under conditions of a displacement amount of 1.6 mm and 5 minutes with changing the vibration frequency. Incidentally, at this time, 2% by mass of needle-like carbon fiber having a diameter of 10 μm, a length of 6 mm, and an aspect ratio of 600 is contained relative to the hydrogen storage alloy. The silicone resin used is an A liquid and a B liquid of WACKER SilGel612 (manufactured by Wacker Asahikasei Silicone Co., Ltd.), which has a liquid viscosity of 1,000 mPa·s at 25° C., and the 1/4 consistency of the gel-like resin at 25° C. is 85 and the mixing amount thereof is 3.5% by mass.

At the time of filling the resin composite material into the tank, it is preferable that a target filling ratio of the hydrogen storage alloy is adjusted so as to be 40 to 55% after vibration.

Next, an apparatus at the time of filling the resin composite material into the tank will be explained based on FIG. 1.

A vibration base 10 has a vibrator plate 11 that is held so that it can vibrate, and the vibrator plate 11 is placed on vibration motors 12A and 12B that are placed in parallel. Incidentally, in the invention, the mechanism of vibration is not particularly limited and an appropriate configuration can be adopted.

On the vibrator plate 11, a tank holder 13 is provided, and a tank 20 for accommodating the hydrogen storage alloy is held to the tank holder 13. In this embodiment, the tank 20 has a cylindrical shape and an opening 21 having an inner diameter smaller than cylinder inner diameter is provided at one end. Incidentally, in the invention, the tank shape is not particularly limited.

On the tank 20, a funnel 15 is disposed such that a tubular part of the funnel 15 is inserted into the opening 21 of the tank 20, and the resin composite material is accommodated in the funnel 15. A scraping rod 18 is disposed at a central axis of the funnel 15 so as to reach inside of the tubular part of the funnel 15.

A filling method using the above apparatus will be explained.

For preparation of alloy filling, the aforementioned hydrogen storage alloy particles or powder, resin, and carbon fiber are added and mixed and are stirred beforehand to prepare a resin composite material 30.

The tank 20 is held by the tank holder 13 as mentioned above, the funnel 15 is placed in the opening 21, and the scraping rod 18 is disposed at a center in the funnel 15.

The resin composite material 30 is supplied in a conical part of the funnel 15 and the resin composite material 30 is filled into the tank 20 with moving the scraping rod 18 vertically. During the filling, two vibration motors 12A and 12B are rotated in reverse directions, respectively, to impart linear vibration of preferably about 1.6 mm at most in a vertical direction to the tank 20. At that time, vibration with a vibration frequency of 30 to 70 Hz is imparted to the tank from the inverter plate (vibrator plate) 11. By moving the scraping rod 18 in a vertical direction 19, the resin composite material 30 to be supplied to the conical part of the funnel 15 is sequentially accommodated in the tank 20. Incidentally, the scraping rod 18 may be one for rotational movement in addition to the vertical movement. The operation of the scraping rod 18 may be done by either manual operation or action of a mechanical device.

By the above action, the resin composite material 30 is uniformly filled into the tank 20 without clogging the funnel 15.

Incidentally, in the above embodiment, there is explained an example in which the resin composite material is supplied to a tank with an opening having a small diameter but, in the invention, the shape of the tank is not particularly limited and is not limited to one with an opening having a small diameter. The following will explain an example thereof.

FIG. 5 shows an example of the other tank to which the present embodiment is applied.

The tank 40 comprises an aluminum-made square cylindrical shape and has edge wall parts 43 and 44 at both sides and an intermediate wall part 45 positioned in the middle therebetween. Medium flow paths (not shown in the figure) are provided on the edge wall parts 43 and 44 and the intermediate wall part 45, respectively, and a water inlet nozzle 41 and a water outlet nozzle 42 provided on the other side wall part are connected to the medium flow path and thus a flow of a medium is made possible.

In the space between the edge wall part 43 and the intermediate wall part 45 and the space between the edge wall part 44 and the intermediate wall part 45, brazed corrugated fins 46 are disposed in the edge wall parts 43 and 44, and the intermediate wall part 45 along vertical directions of the wall parts, respectively. In each of the above spaces, a resin composite material 50 is accommodated in an appropriate filling ratio by the filling method of the present embodiment. Thus, in the present embodiment, it becomes possible to fill a resin composite material with vibration regardless of the tank shape.

Examples

The following will explain Example of the invention in comparison with Comparative Example.

Examples

An aluminum cylinder having an inner volume of 800 mL and an opening inner diameter of 14 mm was prepared.

Moreover, an $AB_5$-based alloy having an average particle size of about 700 μm, 3.5% by mass of a gel-like silicone resin having a viscosity of 1,000 mPa·s and a ¼ consistency of 85 at 25° C., and 2% by mass of needle-like carbon fiber having a diameter of 10 μm, a length of 6 mm, and an aspect ratio of 600 were prepared, and they are mixed and stirred to obtain a resin composite material.

The resin composite material was filled into the tank with setting a target filling ratio to 52% using an apparatus shown in FIG. 1, while imparting vibration under a vibration frequency of 50 Hz, displacement of 1.6 mm, and a vibration time of 5 minutes.

Comparative Example

The same resin composite material as in the above Example was subjected to filling operation into the same tank as above by conventional manual operation (pushing by hand). Since the operation at this time took about 1 hour, the operation efficiency of the present Example was remarkably excellent.

A plurality of lots by the above Example and Comparative Example were prepared and a test of hydrogen charging/discharging characteristics was performed for each lot. In the test, hydrogen charging of 0.99 MPaG as full filling was performed in a water tank at 20° C. and an amount of hydrogen discharging through atmospheric discharging in the water tank at 20° C. was measured. The results are shown in the graphs of FIG. 6 and FIG. 7, respectively. In FIG. 6 and FIG. 7, a horizontal axis showed elapsed time and a vertical axis showed the amount of hydrogen discharging.

In Example, the hydrogen discharging characteristic in each lot was more excellent than that in a conventional tank and the variation thereof was small. On the other hand, in Comparative Example, average discharging characteristic was lower than that in the present Example and the variation was also large.

While the present invention has been described with reference to the above embodiments, it will be apparent to one skilled in the art that adequate changes and modifications can be made therein unless they depart from the spirit and scope thereof. The present application is based on Japanese Patent Application No. 2014-044528 filed on Mar. 7, 2014, and the contents are incorporated herein by reference.

REFERENCE SIGNS LIST

10 Vibration base
11 Vibrator plate
12A Vibration motor
12B Vibration motor
13 Tank holder
15 Funnel
18 Scraping rod
20 Tank
21 Opening of tank
30 Resin composite material
40 Tank
41 Water inlet nozzle
42 Water outlet nozzle
43 Edge wall part of tank
44 Edge wall part of tank
45 Intermediate wall part
46 Corrugated fin
50 Resin composite material

The invention claimed is:

1. A method for filling a hydrogen storage alloy, comprising:

when the hydrogen storage alloy that has been made as a resin composite material by mixing hydrogen storage alloy particles or powder having an average particle diameter of 1 to 1000 μm with a resin, viscosity of the resin at 25° C. being 500 to 10,000 mPa·s, the resin being a gel-like resin having a 1/4 consistency of 10 to 200 at 25° C., and a mixing amount of the resin being 1 to 50% by weight relative to the amount of the hydrogen storage alloy and carbon fiber, the mixing ratio of the carbon fiber being controlled to 0.1 to 5.0% by weight relative to the amount of the hydrogen storage alloy, is filled into a tank, disposing a funnel in an opening of the tank;

disposing a scraping rod extending downward from a central part of the funnel;

filling the hydrogen storage alloy, which has been made as the resin composite material, into the tank through the funnel with scraping of the resin composite material by the scraping rod; and during the filling the hydrogen storage alloy into the tank, vibrating the tank at a predetermined frequency of 30 to 70 Hz through movement at least in a vertical direction for 0.5 to 30 minutes, vibration amount for the movement in the vertical direction being 0.1 to 2.0 mm, to adjust a filling ratio of the hydrogen storage alloy in the tank to 40 to 55%.

* * * * *